Patented Nov. 25, 1952

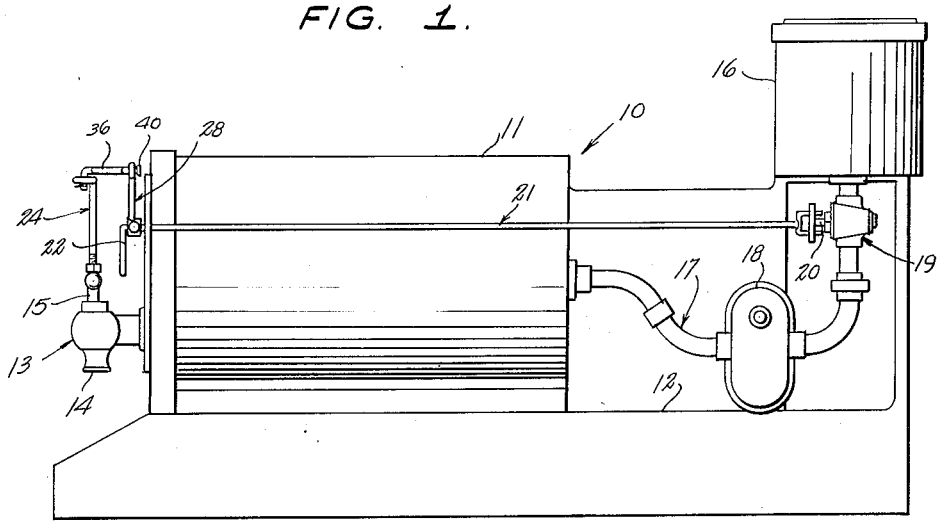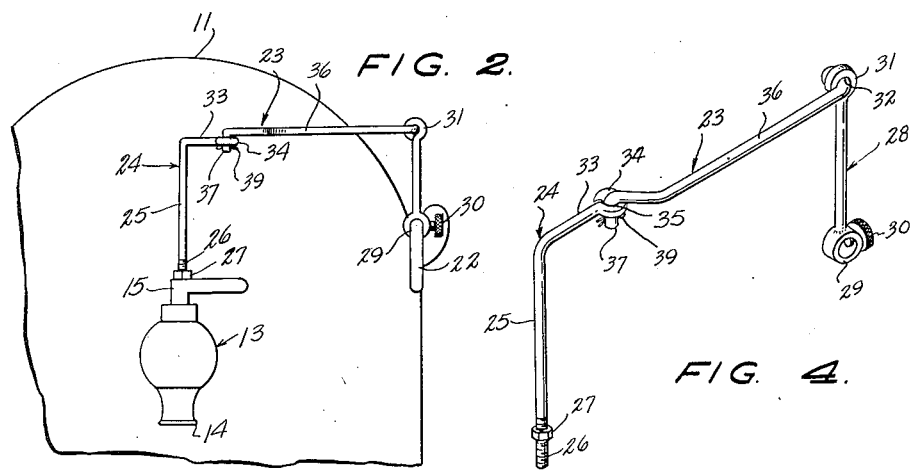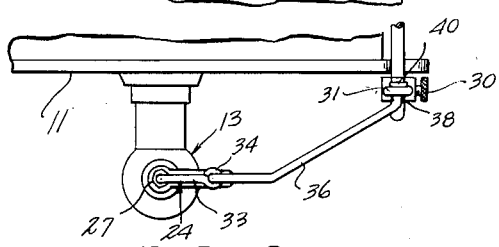

2,619,117

UNITED STATES PATENT OFFICE 2,619,117

FOOD DISPENSING DEVICE

Michael Stranak and Everts B. Linn, Murray, Ky.

Application November 10, 1950, Serial No. 195,054

2 Claims. (Cl. 137—571)

This invention relates to an apparatus for handling foods, and more particularly to a food-dispensing device of the type wherein, as food is being dispensed from the freezing compartment forming a part of the apparatus, the compartment is being simultaneously replenished from a source of supply.

Food-dispensing devices of the type particularly adapted to cold-treat and extrude custard, ice cream, sherbet and the like in a semi-solid condition often include a manually actuated dispensing valve connected to the freezing compartment of the apparatus and a separately actuated valve connected in the closed system between the freezing compartment and the source of supply. When using such food-dispensing devices, considerable difficulty has been encountered in maintaining a predetermined amount of food in the freezing compartment. Often, when the custard, ice cream and the like is being vended, the freezing compartment is allowed to become completely empty. The resultant delay in replenishing the apparatus causes a loss of valuable time and sales.

An object of this invention is to provide a device for cold-treating and extruding foods which is particularly adapted to be automatically fed from a source of supply during the vending of the food.

Another object of this invention is to provide a device for cold-treating and extruding foods which can be fed from a source of supply in an amount predetermined by the amount withdrawn from the device.

A further object of this invention is to provide a food-dispensing device of the type previously described which is relatively simple in structure and cheap to manufacture.

The above and still further objects and advantages of the present invention will become apparent upon consideration of the following detailed description of the invention when taken in conjunction with the accompanying drawings, wherein:

Figure 1 is a side elevational view of the food-dispensing device constructed according to the present invention;

Figure 2 is a fragmentary front elevational view of the food-dispensing device of the present invention, taken from the left of Figure 1;

Figure 3 is a fragmentary top plan view of the food-dispensing device shown in Figure 1; and Figure 4 is an enlarged perspective view of a connecting linkage forming a part of the food-dispensing device of the present invention.

Referring now particularly to the drawings, wherein like reference numerals have been used throughout the several views to designate like parts, there is shown a food dispensing device, generally designated by the reference numeral 10, of the type which is particularly adapted to cold-treat and extrude custard, ice cream, sherbet and the like in a semi-solid condition. The food-dispensing device 10 includes a freezing compartment 11 adapted to contain a predetermined amount of food to be discharged, the freezing compartment 11 being supported on a fixed base 12.

Positioned contiguous to the forward end of the freezing compartment 11 is a manually actuated dispensing valve 13 which is supported in communication with the freezing compartment. The dispensing valve 13 includes an outlet 14 for the egress therethrough of the food to be dispensed and a vertically disposed valve element 15 which is rotatably supported and controls the egress of food through the outlet 14.

Positioned contiguous to and spaced above the rear end of the base 11 is a reservoir 16 which is supported on the base 12 and is adapted to contain a food charge which is to be intermittently supplied to the freezing compartment 11. The type of charge carried within the reservoir 16 is, of course, determined by the food being dispensed from the valve 13.

Connected between the reservoir and the adjacent rear end of the freezing compartment 11 is a closed system or conduit 17 including a pump 18. As the charge from the reservoir 16 is pumped through the closed system 17, air is usually mixed therewith to give the desired palatability and consistency to the finished product which is withdrawn from the dispensing valve 13.

Connected in the closed system 17 between the reservoir 16 and the pump 18 is a control valve 19 for selectively permitting the flow of food charge from the reservoir 16 through the closed system 17 and into the freezing compartment 11. The control valve 19 includes a horizontally disposed, rotatable valve element 20 which is actuable contiguous to the dispensing valve 13 by means of the horizontal control rod 21 which has one end connected to the horizontally disposed, rotatable valve element 20 and has the other end rotatably supported contiguous to the forward end of the freezing compartment 11 and provided with a transversely extending handle 22.

Interconnected between the dispensing valve 13 and the control valve 19 is a linkage structure 23, Figure 4, for opening the control valve 19 in response to the opening of the dispensing valve 13. The linkage structure 23 includes a crank 24 having one vertical leg 25 disposed axially of the rotary valve element 15 and rigidly secured thereto. The securement of the leg 25 of the crank 24 to the rotary valve element 15 is effected by providing the valve element 15 with an axially extending threaded bore and threading the adjacent end of the leg 25, as indicated by the reference numeral 26. Supported on the threaded portion 26 of the leg 25 is a lock nut 27 which is engageable with the adjacent end of the valve element 15, as shown in Figure 2, to aid in the securement of the crank 24 to the valve element 15. Disposed transversely of the rotary valve element 20 of the control valve 19 and the control rod 21 is a lever 28 which has one end detachably secured to the control rod 21. The securement of the lever 28 to the control rod 21 is effected by means of a collar 29 carried contiguous to one end of the lever, the collar 29 being circumposed about the rod 21 and secured thereto by means of the thumb screw 30 which is supported on the collar 29 and is selectively engageable with the rod 21. Thus, the lever will swing in a vertical plane when the control rod rotates. Formed integrally with or secured to the other end of the lever 28 is an enlarged head 31 which is provided with an aperture 32 therethrough.

Similarly, the horizontal leg 33 of the crank 24 has its free end provided with an enlarged head 34 which is provided with an aperture 35 therethrough. Extending between the head 34 of the crank 24 and the head 31 of the lever 28 is a connecting link 36 which has its ends laterally offset, as indicated by the reference numerals 37 and 38, the offset end 37 being rotatably received within the aperture 35 of the head 34 by means of the pin 39 and the offset end 38 being rotatably received and supported within the aperture 32 of the head 31 by means of the abutment 40.

Under actual operating conditions, it is necessary to employ a dispensing valve 13 which can be opened in response to the rotary movement of the valve element 15 in one direction and a control valve 19 which can be opened in response to the rotary movement of the control valve 20 in the opposite direction. For example, if the dispensing valve 13 opens in response to a clockwise movement of the valve element 15, as viewed in Figure 3, the control valve 19 must be movable to an open position in response to the rotary movement of the valve element 20 in a counterclockwise direction. Upon effecting a rotary movement of the control element 15 in a clockwise direction, as viewed in Figure 3, the leg 33 will swing in a horizontal plane, and a force will be exerted on the connecting link 36 to rotate the lever 28 about the longitudinal axis of the control rod 21 and the valve element 20. In this manner, when the dispensing valve 13 is opened to vend the custard, ice cream or the like, the freezing compartment is replenished in an amount predetermined by the amount of food withdrawn through the dispensing valve 13.

While only one embodiment of the food-dispensing device of the present invention has been described, it is readily apparent that numerous modifications can be made without departing from the spirit of the invention as set forth in the appended claims.

What we claim is:

1. In a device for cold-treating and extruding foods, a freezing compartment adapted to contain a predetermined amount of food to be dispensed, a manually actuated dispensing valve including a rotatable valve element connected to said freezing compartment in communication therewith for the egress therethrough of the food, a reservoir adapted to contain a food charge positioned contiguous to said freezing compartment, a conduit connected between said reservoir and said freezing compartment, a control valve including a rotatable valve element connected in said conduit for selectively permitting the flow of the food charge through said conduit and into said freezing compartment, and means connected between the rotary valve elements of said dispensing valve and said control valve for opening the control valve in response to the opening of the dispensing valve, said means including a crank having one leg disposed axially of the rotary valve element of said dispensing valve, said leg being rigidly secured to the dispensing valve element to rotate jointly therewith, a control rod extending axially of and rigidly secured to the rotary valve element of the control valve for rotation therewith, a lever disposed radially of and rigid with said control rod, and a connecting link extending between said lever and the other leg of said crank and pivotally connected therebetween, said link connecting the lever and said other leg for joint swinging movement responsive to rotation of the first-named leg.

2. In a device for cold-treating and extruding foods, a freezing compartment adapted to contain a predetermined amount of food to be dispensed, a manually actuated dispensing valve including a vertically disposed rotatable valve element connected to said freezing compartment in communication therewith for the egress therethrough of the food, a reservoir adapted to contain a food charge positioned contiguous to said freezing compartment, a conduit connected between said reservoir and said freezing compartment, a control valve including a horizontally disposed, rotatable valve element connected in said conduit for selectively permitting the flow of the food charge through said conduit and into said freezing compartment, and means connected between the rotary valve elements of said dispensing valve and said control valve for opening the control valve in response to the opening of the dispensing valve, said means comprising a crank having a vertically disposed leg arranged axially of said rotary valve element of said dispensing valve and rigidly secured thereto, the other leg of the crank swinging in a horizontal plane responsive to rotation of the vertical leg, a horizontal control rod disposed in end-to-end relation with respect to the rotary valve element of said control valve and rigidly connected thereto, a lever disposed radially of and rigid with said control rod to swing in a vertical plane for rotation of the control rod, and a connecting link extending between said lever and the other leg of said crank and pivotally connected therebetween, said link connecting said other leg and the lever for joint swinging movement responsive to rotation of said vertical leg.

MICHAEL STRANAK.
EVERTS B. LINN.

REFERENCES CITED

The following references are of record in the file of this patent:

UNITED STATES PATENTS

| Number | Name | Date |
|---|---|---|
| 754,216 | Hentgen | Mar. 8, 1904 |
| 1,464,893 | Vonde Veld | Aug. 14, 1923 |
| 1,675,231 | Stoke | June 26, 1928 |
| 2,507,255 | Kaufman | May 9, 1950 |